United States Patent
Roberts

(10) Patent No.: US 7,744,792 B2
(45) Date of Patent: Jun. 29, 2010

(54) METHODS FOR CONTINUOUS PROCESSING POLYTETRAFLUOROETHYLENE (PTFE) RESIN

(76) Inventor: Robert Roberts, 8781 SW. 108th St., Ocala, FL (US) 34481

( * ) Notice: Subject to any disclaimer, the term of this patent is extended or adjusted under 35 U.S.C. 154(b) by 0 days.

(21) Appl. No.: 11/701,901

(22) Filed: Jan. 31, 2007

(65) Prior Publication Data

US 2007/0132130 A1 Jun. 14, 2007

Related U.S. Application Data

(63) Continuation-in-part of application No. 10/401,995, filed on Mar. 27, 2003, now abandoned.

(51) Int. Cl.
B29C 67/04 (2006.01)
B32B 7/00 (2006.01)

(52) U.S. Cl. .............. 264/127; 264/86; 241/16

(58) Field of Classification Search .......... 264/127, 264/86, 87, 118, 233; 241/16
See application file for complete search history.

(56) References Cited

U.S. PATENT DOCUMENTS

| | | | |
|---|---|---|---|
| 2,440,190 A | 4/1948 | Alfthan | |
| 2,752,637 A | 7/1956 | Walker et al. | |
| 2,936,301 A | 5/1960 | Thomas | |
| 3,003,912 A | 10/1961 | Harford | |
| 3,010,950 A | 11/1961 | Thomas | |
| 3,277,419 A | 10/1966 | Butz | |
| 3,520,416 A * | 7/1970 | Keedwell | 210/490 |
| 3,556,161 A | 1/1971 | Roberts | |
| 3,766,133 A | 10/1973 | Roberts et al. | |
| 4,153,661 A | 5/1979 | Ree et al. | |
| 4,339,325 A * | 7/1982 | Solomon et al. | 204/296 |
| 4,421,834 A | 12/1983 | Zupancic | |
| 4,576,608 A | 3/1986 | Homsy | |
| 4,950,538 A | 8/1990 | Honda et al. | |
| 5,154,827 A | 10/1992 | Ashelin et al. | |
| 5,324,785 A | 6/1994 | Noda et al. | |
| 5,470,409 A | 11/1995 | Deakyne et al. | |
| 5,910,378 A | 6/1999 | Debe et al. | |
| 5,972,494 A | 10/1999 | Janssens | |
| 6,099,791 A | 8/2000 | Shannon et al. | |
| 6,352,660 B1 * | 3/2002 | Friedrich et al. | 264/102 |
| 2002/0082320 A1 | 6/2002 | Sarkis et al. | |
| 2005/0212160 A1 | 9/2005 | Roberts | |
| 2006/0292324 A1 | 12/2006 | Roberts | |

FOREIGN PATENT DOCUMENTS

| | | |
|---|---|---|
| JP | 6-176750 | 6/1994 |
| JP | 6-238684 | 8/1994 |
| JP | 10-195793 | 7/1998 |
| JP | 2003-49387 | 2/2003 |
| JP | 2004-091948 | 3/2004 |

* cited by examiner

Primary Examiner—Matthew J. Daniels
(74) Attorney, Agent, or Firm—Saliwanchik, Lloyd & Saliwanchik

(57) ABSTRACT

The subject invention pertains to methods for processing polytetrafluoroethylene (PTFE) resin into highly desirable product forms that fill the needs of the fluoropolymer industry. The subject invention concerns methods for making a multi-directional planar oriented PTFE resin structure. PTFE produced by methods of the present invention will challenge or exceed the capabilities of melt processable resins and accomplish many of the goals not previously realized by the fluoropolymer industry. The subject invention also concerns methods for preparing PTFE resin primary colloidal particles. The subject invention also concerns the PTFE primary colloidal particles produced by the methods and products utilizing the particles.

18 Claims, 2 Drawing Sheets

PROJECTION OF A
SECTION OF A
HOMOGENEOUS SLURRY
OF PTFE FIBERS DILUTED
IN ISOPAR H

FIBERS ABOVE
DEPOSITED ON A
POROUS SURFACE
ISOPAR H REMOVED

PROJECTION OF A
SECTION OF A
HOMOGENEOUS SLURRY
OF PTFE FIBERS DILUTED
IN ISOPAR H

FIBERS ABOVE
DEPOSITED ON A
POROUS SURFACE
ISOPAR H REMOVED

METHODS FOR CONTINUOUS PROCESSING POLYTETRAFLUOROETHYLENE (PTFE) RESIN

CROSS-REFERENCE TO A RELATED APPLICATION

This application is a continuation-in-part of application U.S. Ser. No. 10/401,995, filed Mar. 27, 2003, now abandoned which is hereby incorporated by reference in its entirety including any tables, figures, or drawings.

BACKGROUND FOR THE INVENTION

PTFE was considered almost intractable in the early years requiring high performing pressure and complex fabricating methods. Consequently, much lower molecular weight melt processable resins FEP, PFA, ETFE as well as other melt processables were developed. Melt processable types have not fulfilled the needs hoped for PTFE resins. These resins are more expensive and provide new fabrication problems which prohibit their use to produce and form large parts and sheet in a wide range of thicknesses, widths, and lengths. Filled and truly reinforce compositions are impossible to produce from melt processable fluoropolymer resins. Melt process resins did fill a nitch but did not live up to the expectations for PTFE resins.

Since the discovery of PTFE (also known by the tradename "TEFLON") in April of 1938 by Plunkett of DuPont, methods of fabrication have slowly developed due to the unfamiliar polymeric properties of this new material. The extremely high molecular weight and lack of perceptible melt flow of PTFE resin relative to other well-known plastic materials is blamed for PTFE's slow growth. The unfamiliar behavior of PTFE resin as a melt-processable plastic material forced fabricators to look elsewhere for help. New fabrication techniques gradually developed around methods employed for processing powdered ceramics and metals. This trend continued well into the 1950s and 1960s until melt-processable resins were developed and became commercially available with high hopes of solving PTFE resin problems. The molecular weight of these resin types had to be drastically lower to accomplish the desired melt flow for melt extrusion.

Most of the beneficial virtues of higher molecular weight PTFE resins were not found in the melt flow resins developed. It was also discovered that melt process resins do not lend themselves to compounding with fillers and reinforcements. The following art processes for PTFE resin have emerged over the years. Art Skived Sheet Processing.

A virgin PTFE sheet is currently produced by shaving (skiving) a compression-molded cylinder of sintered granular resin held in a lathe. This is done much the same as wood is shaved in the manufacture of plywood. A manufacturing problem arises because of the massive size of the required molded cylinder (billet). Fluoropolymers, such as PTFE, all have a very narrow safe range for melting and sintering. Above the upper safe limit, the PTFE polymer degrades very rapidly and decomposition accelerates as the temperature exceeds that safe limit. In addition, all fluoropolymers possess very low thermal conductivity and require long sintering cycles to accomplish uniform fusion processing cannot be accelerated by raising the temperature. Thermal degradation frequently occurs because of the low thermal conductivity of the PTFE and the lack of needed temperature control during the long sintering cycles required. Even if heating is well controlled, too rapid heating or cooling may result in a cracked billet if thermal expansion and contraction is not uniform. Large billets are sintered standing free, the pseudo-melt is a very stiff gel which if not heated uniformly will sag and may crack. Sintering cycles often require a full day or more to uniformly control the thermal changes. The density of the sintered billet may vary widely from inside to outside as well as from end to end. The variations in density which occur are reflected in the skived sheet's dimensional stability and may cause the sheet to warp so it will not lay flat. The skived sheet retains the memory of its origin and history in the sintered billet; the result is a sort of sine wave in the surface of the sheet when an attempt is made to lay the sheet flat. In order to obtain a flat sheet, the sheet must be subjected to reheating above its remelting point, of 327 degrees Centigrade, to recrystallize the resin and equalize sheet density and thus remove the retained warp and stress held in the sheet. To accomplish flatness the sheet is confined between metal plates and re-sintered above its melt transition temperature (this requires large well controlled ovens). The process for obtaining useable flat sheet as well as billet molding is time and energy intensive, Waste is of the order of 10 to 15 percent (10 to 15%) in trimmings from the ends of the billet and polymer adjacent to the skiving mandrel, etc.

The molding billet process for making PTFE filled sheets has proven to be impractical for many reasons. The molding and sintering steps must be performed within the confines of the billet mold under high pressure (5 to 10,000 plus, PSI). A quality filled composition above 30 percent (30%) by weight is not commercially available. Dulling of the skiving blade by the fillers becomes a major problem. Only granular molding grade PTFE is usable in the billet molding process; coagulated dispersion resin cannot be processed without cracking during sintering.

An Improved Art Molding Resin

PTFE granular resins have been excluded from art processing because all available resins are anisotropic. The polymerized particle is a heterogeneous spongy contiguous construction roughly 300-400 microns average particle size and not workable without particle size changes. When comminuted, to change the above particle size the particle may be reduced to approximately 50 microns plus, yielding a substantial portion of mechanically-produced anisotropic resin fibers as disclosed in U.S. Pat. No. 2,936,301, issued to Thomas, et al. on May 10, 1960. The latter product can be converted to a pellet form by a process disclosed in U.S. Pat. No. 3,766,133, issued to Roberts et al. on Oct. 16, 1973, and marketed by DuPont under the name TEFLON 7. The fibrous particles are anisotropic and display some dimensional instability therefore are not used to produce sheet because preforms are weak and fragile. TEFLON 7 is used in its pelletized form primarily for automatic molding of small parts because of its excellent flow as a pellet.

Biaxial Planar Oriented Sheet.

A method for manufacturing biaxially-oriented structures, such as sheets, was disclosed in Roberts U.S. Pat. No. 3,556,161 known as the biaxial calendering method. This method involves the application of multiple biaxial calendering passes involving concurrent compressive shear stresses to PTFE dispersion resin particles in 16 to 20% wetting liquid. The application of compressive and shear stress components in processing are directed so that the component vectors result in a biaxially planar oriented structured product. The product has excellent properties but limits size and requires multiple processing steps.

Paper Making

The process described in this invention has many of the mechanical characteristics of paper-making. However, papermaking starting materials are usually cellulosic fibers or similar materials processed in a water medium. Fibers made from wood pulp must be pre-processed from the solid timber to become free fibers. The wood is reduced to a pulp by a comminuting and beating process that frees the fibrous material. The reduction to pulp and the further processing is all processed in a water medium. Historically polytetrafluoroethylene resin has been manufactured in particulate form to deliberately avoid any tendency to produce fibers. This was done because all of the automatic methods of processing employed in industry require symmetrical particles with good handling characteristics, namely to be free-flowing and capable of leveling uniformly where a shallow sheet mold is required. Fluoropolymer manufacturers felt that the only way to produce a quality sheet product would depend upon the development of a melt-processable resin type.

Two attempts were made to paper-make coagulated dispersion polymer, disclosed in U.S. Pat. No. 3,003,912, issued to Harford on Oct. 10, 1961, and U.S. Pat. No. 3,010,950, issued to Thomas on Nov. 28, 1961. Both methods attempted to prepare PTFE from coagulated dispersion resin fibers suitable for calendering into sheet. Harford produced processable fibers by paste extruding coagulated dispersion powder lubricated with 20 percent (20%), "Skellysolve E" (a petroleum fraction) to produce a rod containing fibered polytetrafluoroethylene. After the one-eighth inch (⅛") diameter rod was dried, it was cut into one quarter (¼ to 1") lengths. It was found that by rubbing rod segments together vigorously in a micro-pulverizer or hammer mill that the segments would shred to produce a fibered composition. The fibers thus extracted were processed in a water medium according to customary paper-making art. When the felt-like product produced was fused by sintering at 350 to 370 degrees Centigrade, the sheet shrank to 41 percent (41%), of its previous area prior to sintering. The product produced was found to be air permeable and similar to paper. These fibers and the processed fibers were anisotropic, they shrank.

Thomas describes a process in which coagulated dispersion resin particles are "water-cut" in a high speed bladed cutter in water. Cutting is continued until a major portion of the particles are deformed into what is described as "bola-shaped" particles. The powder produced above, according to the teachings, can be calendered into sheet. This patent claims only a polytetrafluoroethylene fine powder form. Both of the patents utilize water as a processing medium. Water is hydrophobic to fluoropolymers and will cause the resin to clump or aggregate. The fact that water does not wet fluoropolymers hinders processing and the forming of pore-free structures. A quality product was never produced utilizing the Harford or Thomas methods. Both products were anisotropic.

Particulate Characteristics Make A Difference.

Particulate differences significantly influence the processing and performance of product. Isotropic fibers are an important aspect of the present invention. Particulate matter is comprised of molecules which are arranged to define the particle shape; essentially, as spheres, plates or fibers. The molecular orientation of the molecules within the particle may influence processing and product performance. X-ray diffraction, infra-red spectroscopy and tensile properties may be utilized to determine these molecular structure differences. Polytetrafluoroethylene resin is one of the longest linear chain molecular polymers and is also very nearly 100 percent (100%) crystalline as polymerized and unmelted; it is and therefore ideal for analysis. (See Roberts U.S. Pat. No. 3,556, 161).

The properties most important dimensionally to processing and product performance are particle size, shape and size distribution; the degree and direction of molecular orientation within each particulate form influences the performance of the fabricated product.

In this invention resin particles and micro-fibers are isotropic; they are form stable and uninfluenced by processing and fabrication. In contrast art resin particles and micro-fibers are anisotropic; product is influenced dimensionally particularly when heated or fused.

Isotropic vs. Anisotropic Properties

These terms are employed to define the dimensional stability of particles and fibers. Art fibered resin and their products are unstable dimensionally, therefore termed anisotropic. For example, fibers produced from paste extruded dispersion resin by Harford U.S. Pat. No. 3,003,912 (referred to on page 7) fabricate into sheet by papermaking methods, in a water medium, produced a porous sheet which shrink 41% in area on sintering, (see column 3, lines 5-6 of the Harford patent). The shrinkage and lack of resin cohesion inhibited resin fusion which is typical of anisotropic product.

In contrast, fibers processed by the present invention from the same dispersion type resin and deposited in the same manner as Harford produces a void free sheet product that is form stable and will lay flat. This product is isotropic.

Granular Compression Molding Resin.

All compression molding resins named in the trade "granular resins" are anisotropic and perform as such. Anisotropy is one of the reasons for poor preform strength, and fragility.

The next most important factor for poor preform strength and poor fusion on sintering is the available particle size, shape and size distribution of PTFE particles available in art granular resins; the as polymerized morphology of granular resin is large; necessitating comminuting. The smallest particles produced are of the order of 50 microns; these particles do not flow or handle well.

The process of the present invention provides the only known method of preparing microscopic size isotropic PTFE particles and also provides a convenient means of handling these microscopic particles, as well as co-processed fibered reinforcements and additives during processing. Colloidal (dispersion size particles) PTFE resin particles are the raw material of choice required by this invention not granular PTFE.

There are the fundamental differences between granular and coagulated dispersion resin, the latter being the source of the colloidal particles for the present invention.

The highest molecular weight PTFE polymer is granular resin used almost exclusively for compression molding; it is the oldest segment of PTFE technology. Coagulated dispersion resin followed years later and has never been seriously considered for anything resembling the processes used for granular resin.

Granular resin is used for automatic compression molding of small parts (rings, washers, gaskets, etc.) and relatively thick cross section parts; cylinders for skiving (shaving) sheet, the only source of PTFE sheet (from several mils thick to ⅛ inch); also used for molding nose cones for missiles and isostatic molding of pipe and fillings. Skived sheet lacks quality without added finishing to relieve stress and permit the sheet to lay flat. Sheet also lacks the length and width required for use in chemical linings.

Automatic and isostatic molding methods were promoted after particle flow problems were solved in the 1960s. Performing pressures greater than 2,000 psi are required to produce low void content sheet. A granular molding resin, suitable for sheet molding, has not been available because low pressure performing and good leveling properties could not be developed. The large size and shape of resin particles as well as anisotropic behavior of available resins promotes poor particle fusion.

An acceptable granular resin was developed in the mid 1950s that had reasonable moldability and handling by Thomas in U.S. Pat. No. 2,936,301 and Roberts et al. in U.S. Pat. No. 3,766,133. Thomas produced a resin with controllable anisotropy that was somewhat fibrous but did not have the desired flow. Roberts et al. devised a method of reconstituting Thomas's fibered resin to produce symmetrical pellets with excellent flow properties and good moldability. This resin form however could not be used to fabricate sheet because of a lack of adequate resin cohesion which contributes to preform fragility, typically produced by anisotropic particles. The resin did handle and flow well where preform pressures above 2000 psi could be developed; however preforms were still fragile and required special handling.

BRIEF SUMMARY OF THE INVENTION

The subject invention pertains to methods for processing polytetrafluoroethylene (PTFE) resin into highly desirable product forms that fill the needs of the fluoropolymer industry. The subject invention concerns methods for making a multi-directional planar oriented PTFE resin structure. PTFE produced by methods of the present invention will challenge or exceed the capabilities of melt processable resins and accomplish many of the goals not previously realized by the fluoropolymer industry. The subject invention also concerns methods for preparing PTFE resin primary colloidal particles. The subject invention also concerns the PTFE primary colloidal particles produced by the methods and products utilizing the particles. The subject invention also concerns PTFE sheet and/or product inherently free of all foreign contaminants.

DETAILED DISCLOSURE OF THE INVENTION

Figure 1:
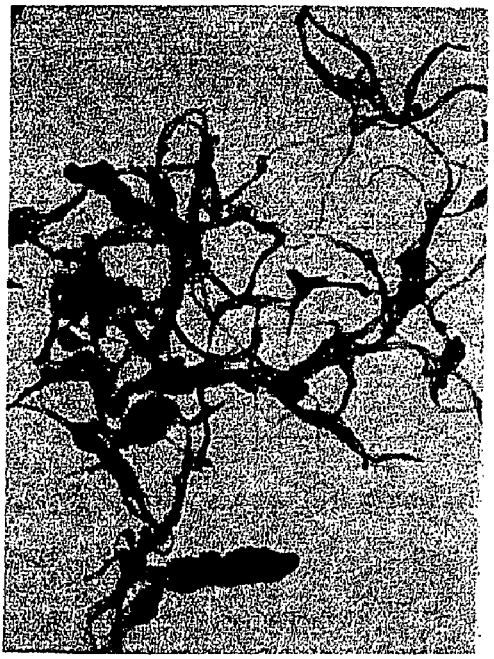
FIG. 1 shows a photomicrograph of TEFLON 6 fibers produced by the present invention in shear at a moderate temperature of 100 degrees Centigrade.

The subject invention concerns methods for making a multi-directional planar oriented PTFE resin product. In one embodiment, the invention comprises providing a slurry of PTFE resin at a temperature between 100 °C. and 300° C., typically around 125° C. The slurry can comprise, in one embodiment, polytetrafluoroethylene resin primary colloidal particles ranging in size from 0.05 to 5.0 microns in diameter and contained within an aggregate particle of a coagulated dispersion resin having an average aggregate size of about 500 microns and a wetting liquid having a surface tension of about 30 dynes/cm or less. The slurry is subjected to shearing and then diluted with a wetting liquid to produce a mixture of diluted micro-fibers. The mixture of diluted micro-fibers is then treated to remove the wetting liquid, for example, by filtering over a porous material, to form a mat of micro-fibers. The micro-fiber mat is dried and/or compressed and/or subjected to sintering.

The subject invention also concerns PTFE primary colloidal particles and methods for preparing PTFE resin primary colloidal particles. In one embodiment, the method comprises mixing an aqueous dispersion of PTFE with an alcohol such as methyl or ethyl alcohol. The liquid containing the PTFE is then removed to yield a cake of PTFE resin colloidal particles. The cake can be washed with additional alcohol to remove remaining water in the cake. The cake is then dried at a temperature less than 342° C. to remove the alcohol. The cake can then be contacted with a suitable wetting liquid having a contact angle of about zero with PTFE resin or having a surface tension of 30 dynes/cm or less, and used in various applications, including for coatings, for paste extrusion, and in methods of the present invention.

This invention recognizes that working with PTFE unsintered primary particles is key to solving the processability of PTFE resins. PTFE primary particles are colloidal size and cannot be handled or processed according to customary art methods due to their small particle size and lack of melt flow.

This invention handles small particles in slurry form which is conducive to homogeneous compounding and the forming of filled and unfilled sheet continuously. Truly reinforced sheet structures may be prepared quickly and uniformly.

This invention provides a convenient method of handling primary PTFE colloidal particles available in an aqueous dispersion or held loosely within a coagulated dispersion resin aggregate.

The primary colloidal PTFE particles extracted from either source remain isotropic and dimensionally stable after processing into product.

While in particulate colloidal form the consolidated slurry may be deposited as a coating that does not crack on drying and sintering. There is no such thing as critical thickness with this composition, as experienced with art water dispersions coatings limited to one mil per coat.

The colloidal particles produced by this invention may also be employed as the feed for paste extrusion; as practiced in U.S. Pat. No. 7,060,210.

Colloidal particles produced by this invention may be processed further to produce isotropic staple length micro-fibers by high speed liquid shear in a wetting liquid at elevated temperature. The micro-fibers blend with reinforcing fibers and micro-fibers to produce biaxially oriented truly reinforced sheet. Processing is continuous in a single step.

Isotropic Micro-Fibers

The subject invention concerns micro-fibers, and methods for producing them, that behave as isotropic matter in sintered molded form.

Resin as processed by this invention is isotropic. When sintered (fused) the x-y dimensions of a molded part will remain virtually unchanged, form stable, however the z dimension, thickness, will increase.

All granular molding resins of the art are anisotropic; major changes in the x-y dimensions of the molding occur while the z dimension, for thickness becomes thinner, when sintered. (See Encyclopedia of Polymer Science and Technology, Volume 13, page 641, paragraph 4, Compression Molding).

Isotropic particles and micro-fibers have physical properties and behavior that is equal regardless of direction of measurement. These particles are neutral to external stimuli; heat or pressure.

Anisotropic particles and micro-fibers have physical properties and behavior that varies according to the direction in which a stimulus is applied or measured; particularly force and temperature. When these stimuli are applied the particles respond and therefore are unstable.

Useful Micro-Fiber Applications

1. Sheet

Micro-fibers deposited from a wetting liquid to form a mat of fibers similar to the deposition of cellulosic fibers processed in papermaking.

Micro-fibered PTFE resin of the present invention can be used in a continuous processing method for fabricating PTFE sheet. The sheet produced is biaxially planar oriented and possesses maximum crystallinity and a density significantly higher than melt processable resins. PFA and FEP are currently the most used by the chemical processing industry for lining; PTFE will provide a significantly better chemical barrier with reduced permeability.

2. Truly Reinforced Sheet

Micro-fibers of the present invention can be employed in a slurry and make it possible to blend reinforcing fibers homogeneously with PTFE micro-fibers to produce a structure that truly reinforces PTFE resin and also imparts biaxially planar orientation. As little as 25 weight percent of reinforcement fiber will provide physical properties which exceed virgin PTFE values.

3. Compounding

Slurry blending affords an excellent opportunity to blend compatible polymers with PTFE or functional fillers. For example polyether ether ketone (PEEK) is compatible with PTFE and also PFA. PEEK will bond with many fillers and reinforcements, notably glass and carbon. Blending any combination of two or more of the above fillers, polymers and reinforcing fibers and you come up with some very interesting synergistic results.

4. Forming and Embossing

Hydrostatic coalescible reinforced sheet may be die cut and formed or embossed with complex patterns that remain remarkably form stable after sintering.

The unsintered die cut waste is reclaimable by re-cycling back through the slurry process to prevent significant loss as waste. Note: Die cutting, forming and embossing of art PTFE resin preforms is impossible because of fragility; a distinct advantage of this invention.

Reworking art PTFE resin preforms is unheard of; because the worked resin and virgin resin will not tolerate any amount of re-work. This is a distinct advantage for this invention.

Colloidal Particle Source

The most direct route to obtain primary colloidal particles should best come from resin polymerized directly in a wetting liquid; possibly an alcohol.

The source of primary colloidal particles for most of the work disclosed here was from coagulated dispersion resin currently manufactured for art paste extrusion.

Aqueous dispersion resin containing a low concentration of surface active agent can provide an alternate workable source of primary colloidal particles. The colloidal particles may be transferred simply by mixing either methyl or ethyl alcohol with the water dispersion and then filtering the PTFE solids from either of these miscible liquids.

Alcohol and water are miscible; addition of alcohol prevents coagulation (acts as a dispersing agent) and damage to the colloidal particles. After filtering an additional wash of the filtered colloidal PTFE solids with alcohol will remove all but a trace of remaining water. The washed and dried colloidal particles may now be blended with ISOPAR H which is miscible with remaining traces of alcohol. Isopar liquids provide a much wider selection of liquids for the compounding of fillers and additives. A more homogeneous dispersion mix is achieved with dispersion particles because of the absence of the skins of the 500 micron coagulated dispersion aggregate. The skins comprise the smallest size particles of the dispersion.

The polytetrafluoroethylene (PTFE) colloidal and micro-fiber resin structures provided by this invention are easily fabricated into a broad spectrum of products; many are new and some enable old technology to be used more efficiently and effectively but all are simple and less restrictive than the current art technology.

Coagulated Dispersion Resin

Coagulated dispersion resin is a lower molecular weight resin polymerized to a lower level than granular resin. The polymerization method provides access to the primary colloidal particles that if handled carefully and properly will retain their colloidal stand-alone unbonded structure as well as isotropic properties. Colloidal particles are primary particles that by virtue of their small size and spherical shape pack closely. A true wetting liquid neutralizes the primary colloidal PTFE surfaces and makes possible the new novel isotropic micro-fibers as well as the isotropic condition and feature of this invention. Air and liquid water are not such mediums; they do not protect the PTFE colloidal particle surfaces, but assist intermolecular forces, and encourage particles to become attached and therefore are stressed similar to granular resin; if they agglomerate they become anisotropic.

It was found by others that when polymerization was terminated, and the product was gently stirred the dispersion particles would coagulate into aggregates averaging 500 microns in diameter. The aggregates would become "non-water wet", a manufacturing term, indicating that these aggregates repelled water and would float as coagulate due to the air content and loss of water within the aggregate. It was also discovered if handled gently with exceptional care no damage to the aggregate would occur for future use. It was also discovered by others that coagulate could be lubricated by a true wetting liquid. (Not water; from which it was extracted). White oil and naphtha type liquids were found suitable; (both liquids have zero contact angles; that significance was not recognized at that time hence, the term lubricant was coined). Once lubricated properly the particles could be paste extruded by plug flow, it was also recognized that the wetting liquid for aggregate lubrication should ideally be about 18 percent, not associated with void volume at that time. Useful inclusion of fillers for extrusion was found by the art to be below 10 percent the result of a lack of mixing with colloidal particles.

Later in U.S. Pat. No. 3,556,161, Roberts found that the PTFE colloid particles could be lubricated by other liquids as long as the PTFE resin surfaces were truly wet. Roberts also found by microscopic cross sectioning that the primary colloidal particles were free to move and unattached. The aggregates contain thousands of average size 0.2 µfree colloidal particles. Roberts U.S. Pat. No. 7,060,210 disclosed that primary colloidal particles can be extruded directly and can also be homogeneously blended with fillers and paste extruded; additionally it is disclosed that fillers can be both uniaxially and biaxially extruded containing up to 90 percent by volume because the dispersion particles are free to mix and not isolated by the skin of the aggregate.

The present invention reveals an alternate source of primary colloidal particles that provides an alternate source for coagulated dispersion resin.

By mixing either methyl or ethyl alcohol with a PTFE water dispersion colloidal PTFE may be safely separated from water as colloidal particles and incorporated with a more desirable wetting liquid.

Colloidal Particle Applications

1. Coatings

PTFE dispersion and slurries in a wetting liquid may be applied to porous surfaces as a coating in any desired thickness without fear of cracking. In art terms there is no "critical thickness" limitation. Furthermore, in addition to PTFE, the coating may contain other fillers or additives, the additive may also include compatible polymers. The solids combined including PTFE may be as high as 90 percent of the total volume and the liquid content may exceed 20 percent to satisfy coating surface conditions.

2. Feed for Paste Extrusion

Particulate forms of the coatings above, in the hydrostatic coalescible form are suitable for paste extrusion employing the methods described in Roberts U.S. Pat. No. 7,060,210 and Roberts U.S. published patent application No. US-2006-0292324.

3. Porous Compositions

The composition prepared for (2) above may include a fugitive poreformer as a filler to produce porous compositions. Poreformers are removed after drying and sintering. Membranes and filters containing fillers and additives are possible. The pore size is replicated by the poreformer's size.

4. Laminated Structures

The hydrostatic coalescible sheet composition of any of the above may be laminated to provide new structures with specific functions.

Method of Producing Stand-Alone Isotropic PTFE Resin Fibers and Micro-Fibers from Colloidal Resin.

The present invention provides methods for processing colloidal (dispersion) particles of PTFE resin to provide isotropic staple micro-fibers as well as inorganic fibers of undetermined length.

As noted previously herein, fibered PTFE resins of the art are anisotropic and dimensionally unstable particularly with increasing temperature and especially during sintering (fusion). Fibers of the art do not mold to void free parts particularly when fillers and other additives are included. Molding of sheet below ⅛ inch thick from particulate resin and particularly fibers is difficult to impossible to level because of poor material flow and poor distribution within the mold cavity; preforms are notoriously weak, subject to cracking and formation of voids that do not heal on fusion (sintering).

Resins on the market similar to DuPont's TEFLON 7 made according to Thomas U.S. Pat. No. 2,936,301 are admittedly anisotropic. This is considered one of the best compression molding resin types but still is incapable of molding large sheets which require better resin distribution and molding pressures greater than 2000 psi; furthermore the preforms are extremely fragile.

In one embodiment, a process of this invention utilizes one or more of the following:

1. A liquid with a contact angle of zero with PTFE surfaces, characteristic of liquids with a surface tension below 30 dynes/cm.
2. Primary colloidal PTFE resin particles with a particle size between 0.05 and 5 microns, (that have never been subjected to melting temperature).
3. A method of producing a liquid shearing action as produced by the peripheral blades of a cutter with a tip blade speed of about 2000 feet per minute or greater.
4. A slurry temperature between 100 and 200° C. preferably about 125° C.

A View of the Micro-Fibering Process

Microscopic examination of liquid sheared primary colloidal particles, sheared at 2000 feet/minute in a heated wetting liquid, cause the colloidal particles to assume asymmetric shapes as shown in FIGS. 1, 2, 3, and 4.

The primary colloidal particles form micro-fibers of staple length as well as larger diameter fibers of undeterminable length at the highest temperature.

Figure 2:
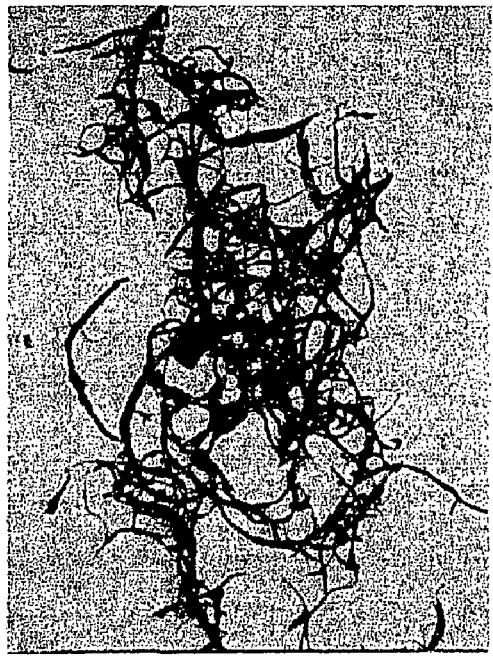
FIG. 2 shows a photomicrograph of TEFLON 6 fibers produced by the present invention at 150 degrees Centigrade.
Figure 3:
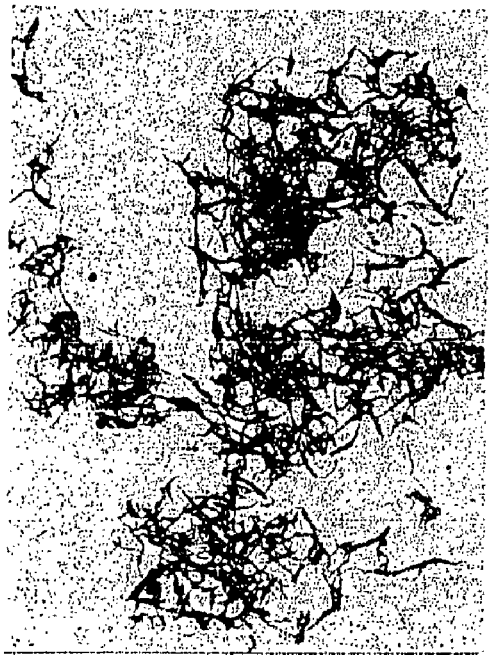
FIG. 3 shows a photomicrograph of TEFLON 6 coagulated dispersion resin fibers produced by the present invention at 125 degrees Centigrade.

The composition of FIGS. 1, 2, and 3 were prepared with ISOPAR H which has a boiling point of 176° C. In order to raise the temperature to 200° C. for FIG. 4, it was necessary to use a liquid with a much higher liquid viscosity and a higher boiling point.

Once fibers or micro-fibers form, the mass of fibered material generated bulks and requires dilution to prevent entanglement and clumping. The thickened slurry mass can be diluted with ambient temperature liquid to insure a free flowing slurry to enable a uniform slurry delivery when filtering; and also to insure that the deposit of fibers on the filtering surface is a uniform thickness.

During the scouting phase of studies it was difficult to determine what was causing the thickening and clumping because the fibers were not visible. Visually the bulk mass resembled a translucent jellied substance; once examined microscopically micro-fibers were revealed and the cause for bulking became apparent.

The micro-fibers produced at 200° C. were not staple length fibers suitable for deposition and papermaking therefore the studies centered on the composition shown in FIG. 3 prepared at 125° C.; the composition selected and employed in this invention. The experiments performed show clearly that very definite stand-alone micro-fibers can be formed and that fiber morphology is controlled by temperature. Liquid viscosity and temperature at 200° C.; affect the rate of fiber formation which increases rapidly, necessitating the rotor speed to be reduced approximately 50 percent. At 125° C. fiber formation was easily controlled. It is obvious that temperature may be adjusted to provide changes in fiber morphology if desired.

These data show very clearly that temperature is the fiber controlling factor.

In earlier studies it was found microscopically that the colloidal particles aggregate as shearing time is extended because some heat is developed. These low temperature studies proved that in the time periods selected fibering does not occur. Increased shear does generate heat and will cause colloidal particles to aggregate, but not sufficiently to cause fibering.

Stand-alone micro-fibering prepared at 125° C. has been found useful in preparing unfilled biaxially planar oriented sheet, as well as biaxially planar oriented truly reinforced sheet, containing micro-fiber reinforcement. Sheet containing only 25 percent reinforcing fibers will provide tensile strengths around 6000 psi; elongations between 1 and 7 percent and tensile modulus values between 200,000 to 300,000 psi. Values obtained will vary with type of fiber reinforcement. The above unsintered sheet product may be die cut and formed into simple shapes and also embossed to produce dimensionally stable complex structure. True reinforcement and forming of PTFE as described above is considered impossible in the art.

Controlling Features of this Process

Capillary Attraction

Capillary attraction is responsible for the success of this invention. When a capillary tube of PTFE 1/32 inch diameter is placed in water (contact angle 108°) the water does not rise; it is repelled. If the same tube is placed in ISOPAR H (contact angle 0°) there is an immediate rise. If a series of progressively smaller PTFE capillary tubes are inserted into the ISOPAR H the capillary rise will increase with the decrease in size of each tube. It can be shown mathematically that a significant increase in cohesive force will result as the tube diameters decrease.

It can also be shown that in the case of water there is a corresponding force repelling water's entry into the tube to force particles apart.

A preform of packed particles forms a complex system of capillaries as in this invention. The pore structure of preforms is comprised of colloidal size particles ranging in diameter 0.05 to 5.0 microns; average diameter 0.2 micron. Calculations indicate the force developed may be as great as or greater than 1000 psi for particles of this average size.

The forces that are drawing particles together are substantial; therefore it should be apparent that there is good reason for the excellent strength, integrity and flexibility of preforms. Likewise there is reason to understand why art preforms have little strength since when wetting is attempted with water particles are thrust apart by pressure and when dry the coalescing force of a wetting liquid has not been able to act; the result, preform fragility.

The force of capillary attraction explains cracking in water dispersion coatings when thicknesses greater than 1 mil are attempted. It also explains why anisotropic granular compression molding powders are fragile. They are dimensionally unstable to begin with and do not have the coalescing assistance of a true wetting liquid during processing. Wettability In the ordinary sense water is understood to wet everything. Actually, all liquids wet surfaces to different degrees. It happens that with regard to fluoropolymer surfaces, including PTFE, water and ISOPAR H are at opposite ends of the wetting scale.

Wettability can be measured by contact angle. Water has a contact angle of 108° with polytetrafluoroethylene resin surfaces (it beads and rolls off the PTFE surfaces). ISOPAR H has a contact angle of 0° because it wets and spreads on PTFE surfaces. Contact angle measurements are not readily available for many liquids and must be determined; however, the surface tension of most liquids is available and correlates directly with contact angle values, and therefore is very useful as a reference.

The wettability of ISOPAR or equivalent liquids is a very important feature of this invention because it allows the wetting liquid to penetrate the very smallest cracks, pores and crevasses of the microscopic and submicroscopic PTFE resin surfaces.

Wettability is very important because it influences capillary flow and therefore developed by the flow. For example; place two 1/16 inch I.D. PTFE tubes or any fluoropolymer tube vertically, one in a container of water and the other in a container of wetting liquid (ISOPAR H or equivalent). Note the instant capillary rise of ISOPAR H while there is no rise at all in the tube immersed in water.

It can be shown mathematically that the energy to produce the capillary rise of ISOPAR H is a function of the diameter of the capillary tube. It can also be shown that the energy repelling water from the PTFE tube increases dependent on the diameter of tube diameter. The smaller the capillary the higher the attracting or repelling force will be. Capillary force can occur in any dimension x, y, or z. The forces of capillary attraction are responsible for the forces holding a preform together, in the instant case; the hydrostatic coalescible state.

PTFE fiber size, morphology and distribution of sizes all contribute a significant influence on the forces holding the preform together and producing a uniform thickness biaxially oriented sheet, well fused product, free of voids and form stable. The smaller the interconnecting pore volume of the porous mat network the greater will be the forces holding the preform together.

It is important to understand that water is not the most undesirable liquid but any liquid that doesn't meet the contact angle requirement is undesirable.

Isoparaffinic liquids, such as ISOPAR H liquid, or any liquid that has a surface tension of 30 dynes/cm or less is acceptable for use in the methods of the present invention. Suitable wetting liquids include, for example, white oil, naphtha, kerosene, Stoddard Solvent and others (wherein the surface tension requirement is met). The addition of surface active agents used with water is not the sole answer as it might seem. The agent must be a liquid at processing temperature in order to wet with sufficient liquid 16 to 20 percent to fill inter-particulate void space of the packing. Most aqueous dispersions of the art contain a maximum of 6 percent surfactant far short of the 16 to 20 percent required to be in the hydrostatic coalescible state.

The ISOPAR family of isoparaffinic liquids is attractive because of the wide range of liquid properties and particularly the compliance with safety and FDA Requirements.

ISOPAR boiling points cover covering the range of usefulness up to the full temperature range claimed in this invention: 100° C. to 200° C. Particularly attractive is ISOPAR M for use at the high end, i.e., about 200° C. This technology may be quite applicable for other uses and applications involving fiber making.

Coating compositions of the instant process may be provided in a variety of consistencies by varying the solids content and also by varying the viscosity of the ISOPAR wetting liquid; over the range shown in the Table below:

| ISOPAR Types | Viscosity | IBP | Surface Tension |
|---|---|---|---|
| C | 0.65 | 98 (208) | 21.2 |
| E | 0.86 | 116 (240) | 22.5 |
| G | 1.35 | 157 (315) | 23.5 |
| H | 1.72 | 176 (348) | 24.9 |
| K | 1.85 | 177 (350) | 25.9 |
| L | 2.12 | 188 (370) | 25.9 |
| M | 3.46 | 207 (405) | 26.6 |

Viscosity: cSt at 25° C. (77° F.)
Initial Boiling Point (IBP): ° C. (° F.)
Surface Tension: dynes/cm at 25° C. (77° F.)
Note:
As temperature increases the surface tension of liquids decreases.

The addition of Sylosiv Molecular Sieve Powder ($SiO_2$) made by Grace, a division of Davidson Chemical Company, can enhance suspension performance and leveling of the applied coating compositions and produce porosity in the sintered part.

Contact Angle (A Measure of Wetting)

Wettability is best defined by the ability of a liquid to wet a surface as measured by that liquid's contact angle with that surface. Water does not wet PTFE resin; it has a contact angle of 108° with PTFE surfaces. In contrast, ISOPAR H spreads on a PTFE surface and, therefore, no angle may be measured; its contact angle is zero. The surface tension of a liquid may be used to aid in selecting a suitable liquid. A liquid having a surface tension of less than 30 dynes/cm is a candidate. It is also important to select a liquid that will have a boiling point within the expected processing range so that the liquid will remain in the liquid phase to wet. For example, ISOPAR H boils at 176° C. whereas processing can take place at around 125° C.

The Hydrostatic Coalescible State

The basis for the hydrostatic coalescible state is capillarity. Capillarity provides the force to draw the particles of a consolidated packing of particles together to provide strength and prevent cracking when the wetting liquid is removed.

These compacting forces plus Van der Waals forces aid particles in contact to coalescence on drying and aid fusion on sintering.

A preform of ideally packed particles contains void spaces ranging between 16 and 20 percent according to J. M. Dalla Valle, "Micromeritics"; The Technology of Fine Particles; Pitman Publishing Co. page 100.-129.

One aspect of the present invention concerns the discovery of a simple method for producing unmelted fibrous polytetrafluoroethylene (PTFE) resin from unmelted dispersion resin and the need to process in a liquid that wets PTFE surfaces.

One embodiment of a method of the invention comprises the following steps:

First, fiber is produced by high speed streamline liquid shearing forces in a 125 degree Centigrade wetting liquid, such as ISOPAR H, for three (3) to five (5) minutes.

The fibrous resin slurry produced is very bulky and requires addition of considerable ambient temperature ISOPAR H dilution (20 to 25 parts), enough to provide a free-flowing homogeneous slurry.

Second, the homogeneous slurry is then poured uniformly onto a porous mold surface under a vacuum of twenty-five (25) to twenty-eight (28) inches to remove the ISOPAR H and form a flexible "fiber mat". A multi-directional planar orientation of PTFE resin micro-fibers is very simply produced as the fibers settle onto the porous surface.

Third, all traces of ISOPAR H in the "fiber mat" are removed by drying the fiber-mat at 100 to 300 degrees Centigrade in an air-circulating oven or under a suitable bank of infrared heaters. In no instance may the "fiber mat" exceed the 342 degree Centigrade melt transition temperature. Thus, the drying temperature must be less than 342° C.

Fourth, to form a flat, smooth surface, the formed "fiber mat" is heated to between 100 to 300 degrees Centigrade or remains hot from drying then is compressed at 500 PSI pressure for 10 to 30 seconds between smooth surface metal plates or even speed heated rolls.

Finally, the formed sheet is free sintered at 380 degrees Centigrade for thirty (30) minutes to one (1) hour or a few minutes by infrared radiation. After sintering, the sheet lays flat and is form stable. Physical properties performed on the sheet are essentially equal over the entire sheet surface no matter how the samples are cut. Since no materials were added to aid micro-fiber formation and the ISOPAR H is volatile, no contaminants remain in the finished product.

It is postulated that other unmelted fluoropolymers might be plasticized by heat and the penetration of a wetting liquid so that high intensity streamline shear might produce micro-fibers similar to those demonstrated by this invention. Other unmelted fluoropolymer resins such as PFA, FEP, ECTFE, and PVDF among others may be candidates for similar processing.

It is known that particulate forms of other crystalline high molecular weight polymers are contained within the raw unmelted particulate polymerized resin. These high molecular weight linear chain structures may be held loosely similar to the polytetrafluoroethylene particulate chains of this invention. High intensity shear, in a wetting liquid, may separate these chains and produce fibered resin similar to the forms seen in this invention. In the event that fibers can be processed from other polymers, this would open an entirely new processing field to discovery. Some very interesting synergistic results may be possible by blending different polymeric fiber chains that are intimately intertwined and may possibly interlock so that they cannot be separated. Some polymer types with very interesting unique properties are polyether ether ketones, polysulfones, polyamides, polyaryl ketone, polyphenylene sulfide, polyamid-imide, polyetherimide, and polyimides. Processing of polymers other than fluoropolymers to form fibers may be possible. Most melt processable crystalline polymers are polymerized as powders or fluff and must be consolidated and degassed before being melted and reconstituted as molding cube. In order to achieve a void-free condition, techniques, such as vacuum melting are employed to remove entrapped air and eliminate air voids in the melted product. Fluoropolymer melt process resins are much more expensive than PTFE resin the extra resin conversion to cubes form is an example of such costs. The discovery that the ability to wet PTFE surfaces is of prime importance in solving many of polytetrafluoroethylene PTFE problems (see U.S. Pat. No. 3,556,161) is observed in this invention. Wetting prevents the particulate resin from sticking together. The wetting liquid neutralizes and lubricates the particulate resin to be formed into fibers by the forces of streamline flow produced by the shearing forces in a high speed blender. The diameter and length of the fibers produced are a function of temperature, blade tip geometry, speed, liquid viscosity, wetting, and the characteristics of the blender-type employed.

The mechanism by which the spherical 0.2 micron dispersion particles are transformed into fiber form cannot be explained. The fiber diameters are often less than the 0.2 micron size found in dispersion form. The total length of the fibers is most frequently significantly longer than 0.2 microns. It might be postulated that the spherical dispersion particles are balls of long chain molecules that unravel under the streamlined shear conditions produced during the fiber forming process of the invention.

Figure 4:
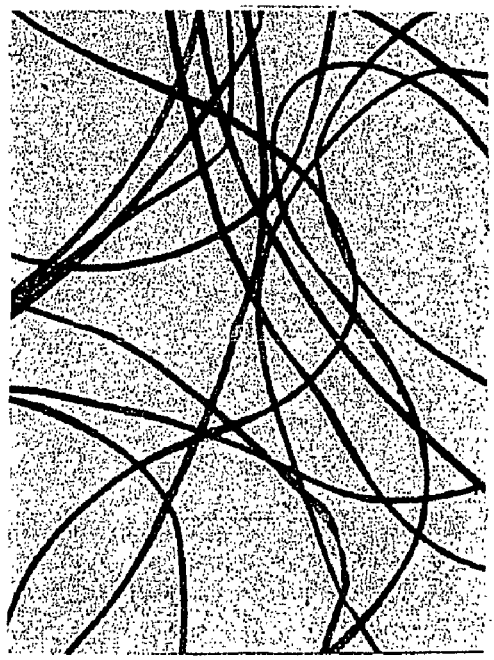
FIG. 4 shows a photomicrograph of TEFLON 6 fibers produced by the present invention at 200 degrees Centigrade.
Figure 5:
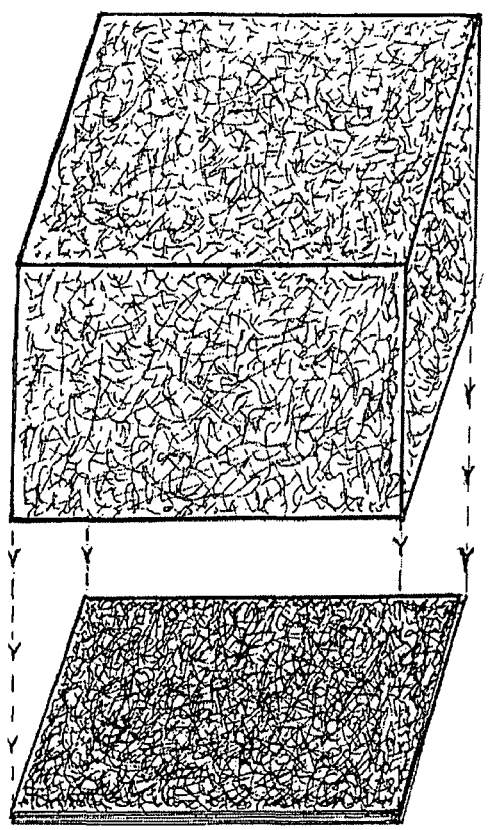
FIG. 5 shows a perspective view showing the formation of the "fiber mat" before heating to form the PTFE resin sheet.

If the liquid shearing process is performed at 200 degrees Centigrade (as shown in FIG. 4) the results show that all of the average size 0.2 micron colloidal particles have been transformed into continuous fiber form. It therefore is quite possible that the long chain molecular polytetrafluoroethylene resin particles have twinned when strung out in parallel array by the hot wetting liquid produced by liquid shear to form single fibers rather than agglomerating and forming a lump.

Once the fibering and blending process has been completed, the homogeneous randomly distributed diluted fiber containing slurry is spread uniformly onto a fine mesh screen or similar surface to remove the liquid component. Liquid removal may be facilitated by the use of a vacuum in either a batch or a continuous process, such as employed in industrial paper-making. The "fiber mat" formed is flexible and easily handled and can be completely dried by heating in a batch oven or in a continuous process by banks of infrared heaters. The drying process must be applied with care so that the drying temperature does not exceed the melt transition temperature of the fluoropolymer resin of 342 degrees Centigrade; a safe upper limit for drying is 300 degrees Centigrade. All material processed up to and including the drying step may be recycled without a loss of final product quality. Recycling can be a significant cost savings especially where products must be die cut from the dried mat, as will be shown later. Once the product has been formed and dried, it may be sintered by heating in an oven or if produced as a continuously formed "fiber mat" by a bank of infrared heaters. Dried "fiber mat" is very versatile and flexible. It can be plied to produce a greater thickness or the plies contain different compositions of fibered materials, such as fillers and/or added reinforcements. Layers may have different functional purposes, such as thermal or electrical conductivity and special frictional properties. Porous polytetrafluoroethylene structures can be produced by the inclusion of sized fillers, such as calcium carbonate or sodium chloride, which can be leached from the sheet after sintering. Such structures can be utilized as microporous asymmetric fluoropolymer membranes. Composite product possibilities are unlimited as a result of plying layers of unsintered product, which facilitates the bonding of the plies. The composite is compressed under moderate pressure with the application of heat below the resin melt transition temperature to consolidate and form the composite. Pressure below 1,000 PSI is usually adequate. The temperature of the plies for consolidation is usually no greater than 300 degrees Centigrade and can be as low as 100 degrees Centigrade. Consolidation will not be successfully achieved if the melt transition temperature of the fluoropolymer resin is exceeded prior to consolidation. After consolidation, the composite structure can be free sintered above the 342 degrees Centigrade fluoropolymer melt transition temperature.

When the desired finished article has a special shape, such as in gasketing or in the manufacture of friction discs, bearing pads, etc. the object can be die cut from the dried "fiber mat" and then processed and finally free sintered individually. After cutting to the desired shape, all of the left over "fiber mat" can be recycled back through the blending process without loss of product quality. Pipe or tubular products can be produced by multiple wraps of "fiber mat" around a mandrel until the desired thickness is achieved. The mandrel defines the inner diameter of the tube. The plies produced by wrapping can be consolidated by the application of hydrostatic pressure as employed in isostatic molding, but at greatly reduced pressure. The finished product produced will possess multi-directional planar orientation. If employed as a part of an isostatic molding process, the problems encountered in filling long mold cavities will no longer exist.

The following explanation of terms used in this application will be helpful in understanding the invention.

Fiber Mat—The non-woven fibers which form a randomly interlocked mat when diluted fibers are deposited on a porous surface.

Multi-Directional Planar Orientation—All fibrous materials (including PTFE fibers) are oriented multi-directional in the x-y plane of the surface and lie parallel in the "z" (thickness) plane on deposition from the diluted slurry. This orientation is characteristic of the method of processing fibrous materials according to this invention and most importantly, but not exclusively, of the PTFE fibers produced as a key part of this invention. In filled and reinforced sheet produced, as a product of this invention the fibrous component of the composite becomes the matrix material or materials for all other material additives.

Wetting Liquid—The contact angle of water with a PTFE surface is approximately 108 degrees. Consequently, water beads on the PTFE surface, i.e. does not wet the PTFE. In contrast, the contact angle of ISOPAR H on a PTFE surface is "0", i.e. it spreads and wets the PTFE surface.

Melting Point—PTFE resin displays two (2) melting points. Virgin PTFE (never previously melted) melts at 342 degrees Centigrade. On remelting the melting point becomes 327 degrees Centigrade.

Lamellae—Thin, plate-like structures in the micron thickness range. If present, lamellae may be viewed microscopically in microtomed cross-sections; also referred to as fault lines.

Laminations—Layers of a sheet composition in the mil thick range and greater may be viewed visually or microscopically.

Calendering (To Orient)—Passing material between two uniform clearance even speed rolls (rotating at a surface speed of approximately two feet per minute in this invention) to reduce the thickness of the processed material (by approximately 50 percent in this invention) each successive pass through the calender is directed 90 degrees to the previous pass resulting in an increase in the area of the sheet produced. The working to produce shear is for the purpose of introducing biaxial planar orientation.

Calendering (To Compact Only)—A single pass through a calender for compaction only or to laminate layers of a composite consisting of two or more layers of sheet. Shear and working of the resin is not the objective and orientation should not occur, the area of the sheet surfaces should not be significantly increased.

Rolling—Results are equivalent to calendering, the choice is a matter of preference to accomplish a particular operation. Rolling is performed on a flat level surface. Accurate sheet caliper is more difficult to maintain than with calendering. Two spacers at both ends of the roll control thickness.

Note: When performed in identical sequence, rolling and calendering have proven to be equal.

Filler—In its original context, filler was a material added to extend the ability and reduce the cost of a polymeric material. As time passed, certain fillers were found to have functional advantages, such as reducing deformation, reducing cold flow or increasing friction or improving thermal and electrical properties of the polymer.

Additives—Additives have usually had a special function, such as to add color, to improve adhesion, to foster nucleation and so forth.

Note: In essence, both fillers and additives are materials added for specific purposes. As years have passed, these two terms have, at times, been used interchangeably.

Hydrostatic Pressure Coalescible Composition—A homogeneous mixture of polytetrafluoroethylene (PTFE) colloidal resin particles, which may or may not contain submicron particulate solids up to 25 microns in size, in a liquid that wets the surface of PTFE and solids, the liquid component maintaining a volume percentage between 16 and 20 percent of the mix to fill the void spaces of a compressed preform. The condition and/or liquid percentage is dependent upon the particle packing of the total solids component. Below 16 percent there is insufficient liquid to fill voids between the particles, thus promoting cavitation. Above 20 percent there is an overabundance of liquid, which promotes turbulence. In the 16 to 20 percent liquid zone, significant cohesive capillary forces develop within the spaces between packed particles which draw the particles together. The resulting cohesion of particles is responsible for the surprising strength developed before a PTFE matrix is developed to further aid the development of strength of preform. The smaller the void sizes the higher the cohesive force will be.

Paste Extrusion—Extrusion of a hydrostatic pressure coalescible composition is called paste extrusion, which is preformed at room temperature; the colloidal PTFE resin component has never been melted. The extrusion mold and its die components are streamlined to prevent cavitation and turbulence. This form of extrusion involves plug flow; the flow is uniaxial, or biaxial planar (also radial in special forming operations). Since the flow is of the plug flow type, particles all move together and no mixing occurs. For example, a tube in the extruder barrel remains a tube when extruded, but has a much smaller diameter and a thinner wall. Coagulated dispersion resin, often called fine powder, is actually a loosely aggregated particle whose average aggregate size is 500 microns, which is far from a fine powder. Roberts U.S. Pat. No. 7,060,210 utilizes colloidal size resin which may be derived from coagulated dispersion resin or obtained directly by a substitution of alcohol for water from an aqueous dispersion.

Matrix Tensile Strength—The tensile strength based on the total cross-section, corrected for the percentage of voids in the structure employed for determining the tensile strength of porous compositions of PTFE.

Lubricant—The wetting employed in paste extrusion is often described as a lubricant.

Wetting Liquid—A low surface tension liquid, (30 dynes/cm or less), that will wet and spread on contact with a PTFE surface (a rapid indication of the possible contact angle of the liquid). ISOPAR H, an isoparaffinic liquid often employed as a solvent but used here as a wetting and neutralizing medium to permit uninhibited mixing of particulate materials, is an example. ISOPAR H is selected here because of its inherent purity, low heat of vaporization for fast evaporation, low odor, high auto-ignition temperature and compliance with Food and Drug Administration (FDA) requirements for food and skin contact.

Colloidal vs. Dispersion Particles—The term dispersion particle refers to a micron size particle dispersed in a liquid medium, whereas a colloidal particle is the micron size particle dispersed in the liquid medium. These terms are often used interchangeably.

Multi-Directional Planar Orientation vs. Biaxial Planar Orientation—The results of these two orientations is technically equivalent. X-ray diffraction and physical property measurements are essentially equal, and involve molecular orientation of PTFE resin molecules. Multi-directional planar orientation is used in this instance because it is descriptive of the process. Biaxial planar orientation is most frequently used to describe the biaxial calendering processes. The resultant molecules orientation is essentially the same, in terms of the results these terms are equivalent.

Particulate Materials (Additives and Fillers)

An advantage of the present invention lies in recognizing the inherent ability to compound, or mix, and process particulate materials in different material forms, such as solids, fibers, platelets, porous particulates, nanoparticles, and the like, with other special particulate particle forms of particulate PTFE type resins homogeneously in a wetting liquid environment.

In the early years, up until the 1960s, solid materials were tagged with the name "fillers" and consisted primarily of particulate carbon, graphite, bronze, chopped glass fibers, and several other basic materials; employed as inexpensive extenders. In the years that followed, a much broader range of materials have been included and the term "additives" has come into use, for example, pigments for color coding of polymers. Ever since the 1960s, both fillers and additives have been used interchangeably. Today, fillers and additives are added to provide many functional purposes and serve to improve and share the valuable properties of PTFE as a matrix for new products. For the above reasons, it is more accurate to name the solid particulate and its special function.

Polymeric Additives (Particle Solids)

A. Particulate fluorocarbon resins that show adhesion to PTFE resin 1) perfluoroalkoxy tetraethylene copolymer resin (PFA), 2) ethylenechlorotrifluoroethylene copolymer resin (E-CTFE), 3) ethylenetetrafluoroethylene copolymer resin (E-TFE), 4) poly(vinylidine fluoride) resin (PVDF), 5) tetrafluoroethylenehexafluoropropylene copolymer resin (FEP), and 6) poly(chlorotrifluoroethylene) resin (CTFE).

B. Particulate polyether resins that show adhesion to polytetrafluoroethylene resin (PTFE), 1) polyether ether ketone resin (PEEK), 2) polyether ketone resin (PEK), and 3) polyethersulfone resin (PES).

C. Particulate polymethylmethacrylate is a fugitive resin that will decompose when heated above its melting point. In particulate form, it will mix with PTFE resin and leave voids in the PTFE matrix replicating the size of each fugitive particle.

D. Particulate polytetrafluoroethylene (PTFE) resin molding grade granular may be added beneficially up to 50 percent (50%) of PTFE content in many compositions with colloidal particles alone or with other particulate materials. This addition will save resin cost since granular PTFE is less expensive. Particulate modified granular forms may also be added, for example "TFM", marketed by Dyneon, for compression molding applications as a modified PTFE (1705) resin.

Inorganic Fillers (Particulate Solids)

A. Particulate crystalline inorganic materials that are similar in chemical resistance to PTFE, a nitride, a diboride, silicon carbide, zirconium carbide, tungsten carbide and boroncarbide.

B. Particulate metal powders, such as gold, silver, platinum, iron, aluminum, copper, bronze, titanium, and the like.

C. Particulate materials added to impart thermal and electrical conductivity, such as carbon, graphite, silicon carbide, gold, silver, and metal oxides.

D. Particulate fillers to control the friction and wear of PTFE articles, such as silicon carbide, graphite, molybdenum, chopped glass fibers, and mica.

E. Particulate fillers, such as mica to improve electrical properties, and carbon and graphite to conduct electricity, ceramic oxide catalysts suspended in PTFE porous membranes employed in fuel cell constructions as catalysts.

F. In some instances, for example, in making PTFE porous composition, particulate fugitive materials, such as calcium carbonate may be added and removed by chemicals or sodium chloride, removed by water.

In summary, any material capable of withstanding the fusion temperature range of PTFE (342 to 400 degrees Centigrade) may be included as long as it is useful in some way. Use of explosive materials, such as thermit process components, should be avoided. There will also be cases where it is highly desirable to have extremely small particles, for example, in preparation of porous membrane structures and filters where the particle size will determine the pore size after the particles are extracted from the PTFE matrix.

All PTFE resin types employed in the examples of this invention are DuPont TEFLON resins; equivalents are sold by Dyneon, Asahi Glass, Daikin, Sumitomo, Ausimont, and others. All PTFE resins processed by the present invention are virgin-type, i.e., have never been previously sintered. TEFLON is DuPont's trademark for all fluoropolymer resins. Some examples of DuPont PTFE coagulated dispersion resin types are TEFLON 6, 6C., and 60. Granular types of TEFLON 7, 7A, and 7C. TEFLON 9B is a granular resin, but is pre-melted and therefore not acceptable. Other manufacturers of PTFE follows: Asahi Glass is trademarked FLUON. The Ausimont trademark is ALGOFLON. Daikin fluoropolymer resins are marketed in the United States of America by Sumitomo trademarked as NEOFLON. All of the above resin types may be employed in this invention provided they are PTFE dispersion resin types previously melted.

The methods of the present invention provide a direct single step method of producing highly desirable biaxial planar oriented sheet and flexible preform comprised of a matrix of polytetrafluoroethylene (PTFE) resin micro-fibers in continuous form. A 125° C. wetting liquid (contact angle "0" with PTFE surfaces) provides the ideal medium for handling and processing the PTFE resin to form micro-fibers in only 3 to 5 minutes. Truly reinforced PTFE sheet and flexible formable preform may be produced by adding reinforcement fibers concurrently with PTFE for micro-fiber formation. True reinforcement of PTFE product is not currently available.

This process differs from the much more complex multiple biaxial and time consuming calendering processes of Roberts U.S. Pat. No. 3,556,161; Lo, Thomas U.S. Pat. No. 4,863,604 and Ashelin, Thomas U.S. Pat. No. 5,154,827. The Lo patent deals primarily with asymmetric membrane filters; the Ashelin patent deals primarily with the cartridge which contains the filter. U.S. Pat. No. 7,060,210 involves a simplified two-step paste extrusion and re-extrusion process or, alternatively, uniaxial paste extrusion in the initial step followed by a single calendering or rolling step to complete the biaxial reorienting process.

EXAMPLE 1

This example provides primary stand-alone colloidal (dispersion) PTFE resin particles, the basic resin form utilized in the present invention and a method of isolating these colloidal particles for use. These colloidal particles are commercially available as aqueous dispersions. The method of retrieving PTFE particles utilizes the miscibility of water with true PTFE wetting liquids such as methyl or ethyl alcohol. Water and alcohol are removed by filtering, and the colloidal PTFE particles are transferred to ISOPAR H, the wetting liquid selected for fibering. Traces of alcohol which may remain are miscible with ISOPAR H. ISOPAR H was selected as the wetting liquid for processing colloidal PTFE to produce micro-fibers because it has a boiling point of 176 degrees Centigrade and will remain in the liquid state as the PTFE resin is processed at 125 degrees Centigrade. To accomplish the above separation; three (3) volumes of DuPont TEFLON TD-37 (or equivalent aqueous dispersion of PTFE) are mixed with zero (0) to three (3) volumes of water and one (1) volume of alcohol and then, the slurry is filtered to remove the liquid components. The PTFE filter cake is washed of colloidal particles with alcohol, and then dried below 100° C. to remove all but a trace of alcohol. The dried PTFE colloidal filter cake particles can be employed as the starting resin mixed with wetting liquid as a coating composition; or as a paste extrusion composition in the hydrostatic coalescible state, containing 18 percent (18%) wetting liquid. The resin also may be combined with sufficient liquid, e.g., ISOPAR H, (1 part solids including PTFE resin to 20 parts ISOPAR H) for processing the PTFE component into micro-fibers in a slurry for coating or as a fiber mat for further processing.

EXAMPLE 2

This example employs the primary colloidal PTFE particles contained within the coagulated dispersion aggregate for use in the present invention. In one embodiment, the colloidal particles are released from within the coagulated dispersion particle aggregate envelope (500 microns average particle size) by liquid shearing forces in ISOPAR H at ambient temperature. The PTFE coagulate is bathed in the wetting liquid which penetrates the aggregate packed with 0.2 micron average size discrete colloidal particles. The liquid shearing forces produced by a high speed disintegrator employing a tip rotor speed of about 2,000 feet per minute releases thousands of colloidal particles. These PTFE colloidal particles are separated from the liquid as a filter cake of primary particles for use in various applications. The dried particles may also be mixed with ISOPAR H or a wetting liquid with the desired viscosity for use as a coating composition or combined and mixed with the desired filler or additive materials for paste extrusion by adding 18 percent (18%) wetting liquid with the solids. The filtered PTFE resin or resin and filler/additive combinations with or without reinforcement fibers may be further processed to form PTFE resin micro-fibers as in Example 3.

EXAMPLE 3

This example illustrates the processing of coagulated dispersion polytetrafluoroethylene resin to produce sheet by the present invention. In one embodiment, twenty (20) parts of ISOPAR H hydrocarbon oil (Exxon) are added to one (1) part of TEFLON 6 (DuPont) coagulated dispersion resin (having an average particle size of 500 microns) in a high intensity stirrer. The two (2) components are mixed for three (3) minutes at a temperature of 125 degrees Centigrade producing a thick slurry of fibered particles. The particles produced are one quarter inch (¼") to three eights inch (⅜") long with average diameters ranging from five (5) to thirty (30) microns. The thick slurry is diluted further with thirty-five (35) parts of ambient temperature ISOPAR H and stirred an additional forty-five (45) seconds to produce a thinned homogeneous slurry. The thinned slurry is poured into a twelve inch by twelve inch (12" by 12") paper mold (containing a Whatman No. 1 filter paper). A vacuum of approximately twenty-five inches (25") of mercury was applied to settle the particles and remove the liquid component and form a "fiber mat". The "fiber mat" is dried further at 125 degrees Centigrade in an oven to volatilize all remaining ISOPAR H. The thoroughly dried "fiber mat" is then compressed at a pressure of approximately 500 PSI at a temperature of 175 degrees Centigrade to provide a 0.030 inch thick sheet with a smooth surface. The sheet is then free sintered for one (1) hour in an oven at 380 degrees Centigrade. The above sheet had an average tensile strength of 4,500 PSI and an average elongation of 350 percent (350%).

EXAMPLE 4

The process is essentially the same as Example 3 except that only the primary colloidal particles are obtained as a product of Example 1.

EXAMPLE 5

This example illustrates true reinforcement of PTFE fluorocarbon resin by the addition of one half inch (½") to three quarter inch (¾") diameter superfine glass fibers. One part of the solids component consists of twenty-five percent (25%) one half inch (½") to three quarter inch (¾") "Beta Fiberglass". The other portion is seventy-five percent (75%) TEFLON 6. Both parts are added to twenty (20) parts of ISOPAR H at 125 degrees Centigrade and sheared in a high intensity stirrer for three (3) minutes. The slurry produced is further diluted with thirty-five (35) parts of ISOPAR H and stirred for an additional one (1) minute to produce a thin homogeneous slurry. The thinned slurry is treated the same as in Example III. After sintering, the sheet has an average tensile strength of 6,000 PSI and an average elongation of five percent (5%) when measured in any direction. The tensile modulus is 250,000 PSI. Ordinarily, fillers in art processes reduce the tensile properties by an amount proportional to the percentage of filler added. The tensile strength in this example is surprisingly equal to or greater than that of one hundred percent (100%) PTFE sheet (i.e., no fillers added).

EXAMPLE 6

Primary colloidal particles derived by the method of Example 1 can be used alternatively to produce a product similar to that of Example 5.

EXAMPLE 7

This example demonstrates the synergistic effect produced by adding micron size polymer particles that are compatible with PTFE resin to impart new improved properties to the finished product. The addition may be made to any of the following Examples 3, 4, 5, and 6. In one embodiment, the polymer added is polyether ether ketone (PEEK). Thirty (30) percent by volume is added based on solids content, to the PTFE resin solids of one of the above examples. The addition of PEEK improves physical properties, particularly where reinforcement fibers are added as in Example 5; here PEEK bonds to both PTFE and also to glass fibers. Other polymers that are compatible with PTFE, include, but are not limited to, polyether ketone (PEK), polyethersulfone (PES), polyphenylene sulfide (PPS). PEEK has exceptional adhesion to metals.

EXAMPLE 8

Blends of melt processable fluoropolymers containing as little as 15 to 25 percent (15% to 25%) of matrix PTFE resin micro-fibers might provide an economic processing alternative to more expensive melt processable resin. Preforms of these resin blends with a PTFE matrix would provide an alternate means of shaping and forming structures that have a biaxially oriented matrix and permit melt extrusion resins to include filler and inorganic fiber reinforcement. Candidates for blending include, but are not limited to, PFA, FEP, CTFE, E-CTFE, E-TFE, PPS, and PVDF. Synergistic results may be expected.

EXAMPLE 9

This example demonstrates the production of true stand-alone micro-fibers free of contamination. These micro-fibers have the proper dimensions and morphology and process continuously similar to cellulose fibers employed in papermaking. Micro-fibers processed at 125 degrees Centigrade exhibit excellent stand-alone characteristics; reinforcement fibers may be included if desired during processing. The PTFE micro-fibers produce excellent quality virgin biaxially planar oriented sheet on a continuous basis. The same process including reinforcement provides a source of truly reinforced sheet and a source of unsintered hydrostatic coalescible preform that may be shaped, formed and embossed. Since all preformed product produced is isotropic the sintered structure remains dimensionally stable. All products made by this process are biaxial planar oriented.

EXAMPLE 10

This example demonstrates the typical steps required to apply an art aqueous coating to a woven porous glass fiber matrix; accomplished by dipping the woven structure into the aqueous coating composition. Multiple passes are required to build the desired thickness free of cracks. Up to 6 percent (6%) surfactant is included in the coating composition. The typical thickness that may be applied without cracking is 25.4 microns (1 mil) when dried. Each coating must be dried to remove water (typically at 120° C.) then baked to remove the surfactant at 290° C.; and optionally calendered, then heated above the PTFE resin molding point, 342° C., to sinter the coating. This procedure is repeated until the desired thickness is obtained.

EXAMPLE 11

This example demonstrates the use of coating compositions that are produced according to Example I. In one embodiment, a coating contains 60 percent (60%) solids comprising particulate dispersion PTFE resin prepared by Example 1 applied in a single dip coating step to a porous web surface then oven dried at a temperature below 300° C. and finally sintered above the PTFE resin crystalline melting point of 342° C. No cracking or peeling has occurred and the coating is approximately 5 mils (0.005 inch) thick.

EXAMPLE 12

This example demonstrates the use of a coating composition made from the slurried composition of micro-fibers produced in Example 3. This slurry is cast as a coating onto a glass mat of 2 to 5 micron diameter glass fibers ½ to ¾ inch long to act as a binder for the glass fiber-mat and remain porous. Such compositions are employed as separators in electrochemical cells.

The resultant coating is dried and sintered. Porosity may be adjusted by the addition of Molecular Sieve Powder ($SiO_2$) sold by the Grace Division Syloid Products Group as Sylosiv.

EXAMPLE 13

Fillers, reinforcements and polymer additions may be added to improve the properties of coatings produced by Examples 1 and 2 by simply adding one or more of these components during processing of the PTFE resin.

EXAMPLE 14

The addition of silicon carbide or the like to the process of Examples 3 and 4 will improve abrasion resistance and maintain inert properties of the composition.

EXAMPLE 15

The addition of PEEK during the PTFE resin fibering process along with a reinforcement fiber provides improvement through attachment of the PEEK resin to both the PTFE micro-fibers and the fiber reinforcement component. Thus, adding strength and stiffening to the product dependent upon the type, strength and amount of the reinforcement additions.

EXAMPLE 16

Fluoropolymers are well noted for their anti-stick qualities. This example describes the inclusion of polymers that will adhere to fluoropolymers and more particularly to PTFE resin surfaces as well as surfaces tolerant to temperatures in the range of 342 to 400 degrees Centigrade. Effective changes in properties may be accomplished by adding at least 15 volume percent of particulate micron size polymer to PTFE resin, in either micron size or fiber form, to a slurry mix. The total solids mix must not exceed 90 volume percent including PTFE resin solids. In order to be most effective sufficient melt processable resin is necessary to flow into and fill the PTFE resin preform voids estimated to be 15 to 20 percent (15% to 20%) of the preform structure.

EXAMPLE 17

This example illustrates the processing of a mixture of granular resin and coagulated dispersion polytetrafluoroethylene resin to produce sheet by this invention. In one embodiment, twenty (20) parts of ISOPAR H are added to one (1) part of a mixture consisting of thirty percent (30%) TEFLON 7 and 70 percent (70%) TEFLON 6. The processing continues as described in Example 3. The finished sheet has an average tensile strength 4,600 PSI and an average elongation of 360 percent (360%).

EXAMPLE 18

This example illustrates the processing of a fibrous ceramic component with granular polytetrafluoroethylene resin to produce a sheet by this invention. In one embodiment, thirty (30) parts of ISOPAR H are added to one (1) part of solids composed of thirty percent (30%) FIBERFRAX manufactured by the Norton Company (formerly Sohio Engineering Materials Company/Carborundum) and seventy percent (70%) TEFLON 6. FIBERFRAX is the trade name for a fibered ceramic composed of 53.9 percent by weight of silica and 43.4 percent by weight of alumina with a melting point of 1,790 degrees Centigrade it posses superior corrosion resistance, high resistance to oxidation and reduction and complete resistance to moisture. FIBERFRAX has a high aspect ratio of 200 to 1,000 often included in friction and filtration applications as well as for the reinforcement of plastics. The processing continues as in Example V. The finished 0.030 inch thick sheet composition has an average tensile strength of 2,200 PSI and an average percent elongation of 170 percent (170%) with superior resistance to creep and friction.

EXAMPLE 19

This example demonstrates the utility of the composition produced in Example 18. At the conclusion of the drying step in Example 18, a portion of the dried "fiber mat" is die cut to produce a ring six inches (6") I.D. and eight inches (8") O.D.. The die cut ring is placed in a heated mold which contains a bottom plate with a raised face embossing pattern. The pattern in this case is a grooved helix with intersecting radiating grooves every sixty (60) degrees. The raised pattern of the embossing tool is half rounded and has a radius of approximately fifteen thousands of an inch. The mold with embossing pattern facing up is heated to approximately 260 degrees Centigrade. The die cut "fiber mat" is placed in a mold. A silicone rubber caul 0.025 inch thick is placed on top of the "fiber mat" followed by the top metal compressing ring. A pressure of 2,000 PSI is applied for one (1) minute and then the silicone rubber caul is removed and the compression ring returned. The mold is closed for fifteen (15) seconds and 2,000 PSI pressure is applied for fifteen (15) seconds. The last step flattens any raised areas on the backside of the molded part as well as the part. The embossed part is removed from the mold. The embossed grooves remain accurately replicated in the part. The embossed part is free sintered in an air-circulating oven for thirty (30 minutes at 380 degree Centigrade. Sintering has not altered the dimensions of the part and the grooves imparted by the embossing tool are accurately replicated in the part. The grooved disc 0.030 inch thick is to be one (1) of six (6) like parts to become a facing on metal components for a clutch pack utilized in heavy equipment such as earth movers manufactured by Caterpillar Tractor Company and the like. Such clutch pack surfaces are wetted with high temperature heat transfer liquids that are circulated through the pack to remove the heat generated by the friction of engagement. The grooves in the facing help to reduce the heat generated on the friction generating surface. The clutch facings by this invention were bonded to one (1) surface of each disc. In order to bond the facing of the metal disc, the backside of the facing produced was chemically etched employing a sodium complex etchant (available commercially) and then bonded to the metal clutch disc with an epoxy-phenolic adhesive sold by Raybestos-Manhatten. A heavy equipment manufacturer tested a pack of six (6) discs in a torture test to find surprisingly positive performance and endurance. Laboratory tests were also performed on an inertia-stop testing apparatus. The presentation showed smooth engagement and disengagement which is highly desirable in heavy equipment. The clutch-facing bond has high resistance to torque and the facing long resistance to wear.

EXAMPLE 20

This example demonstrates the inability of the art to manufacture a product similar to Example V. The art processes have been unable to mold thin filled composition particularly fibered materials. Molded parts are extremely fragile because resins and fillers and particularly fibers will not cohesively bond even when attempts to preform are made at extremely high pressure. Thin sheet would by necessity be made by skiving (shaving) a billet (cylinder) in a lathe. Skiving would be prohibitive because FIBERFRAX would dull the skiving blade. The pattern embossed in the molded clutch facing material is embossed by coining. Coining is accomplished by heating the filled sintered sheet above the 342 degree melt temperature of the PTFE resin and compressing the embossing pattern into the sheet to replicate the pattern. The finished coined sheet does not have dimensional stability and the embossed pattern is not accurately replicated due to shrinkage and warping.

EXAMPLE 21

This example demonstrates the invention's use in manufacturing asymmetric porous integral membranes for use in filtration in the electronics and pharmaceutical industries. Twenty (20) parts ISOPAR H are added to one (1) part of solids of which twenty percent (20%) is TEFLON 6 and eighty percent (80%) is calcium carbonate, the pore former, having an average particle size of ten (10) microns. The two components are mixed for three (3) minutes in a high shear cutter operating at a peripheral speed of 2,000 feet per minute at a temperature of 125 degrees Centigrade to produce a heavy slurry. The heavy slurry is diluted further with thirty-five (35) parts of ambient temperature ISOPAR H and stirred for an additional forty-five (45) seconds to produce a thinned homogeneous slurry. The thinned slurry is poured into a twelve inch by twelve inch (12" by 12") paper mold containing a Whatman No.1 filter paper. A vacuum of approximately twenty-five inches (25") of mercury is applied to settle the solids and remove 6 the liquid component and form a "fiber mat". The "fiber mat" is dried in an oven set at one hundred (100) to two hundred (200) degrees Centigrade to remove all traces of ISOPAR H. the sheet is set aside. A second sheet is prepared using the same procedure as above, only the particle size of the calcium carbonate is five (5) microns average particle size. After drying the sheet is set aside. A third sheet is prepared using the same procedure only the calcium carbonate is two (2) to three (3) microns average particle size. After drying, the sheet is set aside. The three sheets are now plied according to ascending average particle size. The plied sheets are then heated to 175 degrees Centigrade and compressed at 500 PSI to bond the plies. The plied composite is then free sintered at 380 degrees Centigrade for thirty (30) minutes and air cooled to room temperature. The composite sheet is then treated with dilute hydrochloric acid to leach the calcium carbonate from the composite. Once free of the calcium carbonate, the sheet is washed with water to remove all traces of acid. The average pore size of each layer replicates the particle size of the calcium carbonate employed as the pore former in each polytetrafluoroethylene filtering membrane layer. The size of the pores produced is directly proportionate to the size of the pore former and can range from sub-micron sizes to macro-size particles dependent entirely upon the ability to process suitable leachable particulate materials.

EXAMPLE 22

This example demonstrates the addition of a filler component to provide electrical resistivity and more particularly, a structure made according to this invention which is not sintered. Surprisingly, the composition exhibits isotropic resistance heating characteristics. The heating characteristics were found to be essentially constant over the entire multi-directional planar oriented structure surface even when there is a variation in the current flow. Customarily, the resistance of carbon decreases as the temperature is increased. Surprisingly, the resistance of the structure made by this invention remains substantially constant as the temperature is increased. 2,000 ml of ISOPAR H are added to the chamber of a high intensity stirrer and heated to 125 degrees Centigrade. In this example 150 grams of TEFLON 6 coagulated dispersion resin (DuPont) was added to the stirring vessel and exposed to the high streamlined shear of the stirrer for three (3) minutes to produce a micro-fiber structured TEFLON 6. An additional 2,000 ml of ISOPAR H was added, followed by 80 grams of 0.03 micron carbon black (Vulcan 72). The above mixture was stirred for one (1) minute, followed by the addition of 270 grams of silica (Opal Supersil), average particle size, 7 microns. The mixture was stirred for an additional thirty (30) seconds to produce a homogeneous slurry. The slurry was then poured onto a paper mold containing a Whatman No. 1 filter paper. A vacuum of approximately twenty-five inches (25") of mercury was applied to remove the liquid and settle the mixture and form a "fiber mat" on the filtering media. Complete removal of residual liquid is accomplished by heating in a circulating air oven at a temperature of 200 degrees Centigrade or higher (but should never approach the 342 degree Centigrade melting point of the fluoropolymer). The composite sheet was then trimmed to the desired dimensions and positioned on wallboard. A cooper electrode was placed at either end and a sheet of polypropylene is placed over the top of the lay-up. The lay-up was heated to 100degrees Centigrade and pressed at 350 PSI for ten (10) minutes to produce a bond. The finished composition is unsintered. The resistance of the sandwich as calculated by Ohm's law is essentially constant. The resistance of carbon when alone increases under similar conditions. The resistance of the sandwich surprisingly remained essentially constant as the temperature was increased.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

U.S. Pat. No. 2,936,301
U.S. Pat. No. 3,766,133
U.S. Pat. No. 3,003,912
U.S. Pat. No. 3,010,950
U.S. Pat. No. 3,556,161
U.S. Pat. No. 7,060,210
U.S. Pat. No. 3,766,133
U.S. Pat. No. 4,863,604
U.S. Pat. No. 5,154,827
"Compression Molding," Encyclopedia of Polymer Science and Technology, 1970, Volume 13, page 641 paragraph 4, John Wiley and Sons, Inc.
Dalla Valle, J.M., "Micromeritics," The Technology of Fine Particles, 1943, pages 100-129, Pitman Publishing Company.

The invention claimed is:

1. A process for making staple length micro-fibers in a multi-directional planar oriented isotropic polytetrafluoroethylene (PTFE) resin structure, said method comprising the steps of:
(a) preparing a wetting liquid slurry of 20 parts of wetting liquid to 1 part polytetrafluoroethylene resin at a temperature of about 125° C. comprising:
(i) polytetrafluoroethylene resin primary dispersion particles ranging in size from 0.05 to 5.0 microns in diameter contained within an aggregate particle of a coagulated dispersion resin having an average aggregate size of about 500 microns; and (ii) a wetting liquid having a contact angle near zero and that will spread on PTFE polymer surfaces, wherein said wetting liquid has a surface tension of about 30 dynes/cm or less;

(b) applying to said slurry a liquid shearing force provided by a high shear stirrer operating at a tip speed of 2000 feet/minute or higher to produce a an isotropic micro-fibered polytetrafluoroethylene resin slurry;

(c) after step (b) diluting said micro-fiber slurry with 35 volumes of a wetting liquid at ambient temperature to terminate fiber formation and provide a free flowing mixture of diluted micro-fibers;

(d) uniformly depositing said diluted micro-fiber slurry onto a porous surface to form a homogeneous uniform thickness mat of micro-fibers wherein said wetting liquid is removed such that 16 to 20 percent of said wetting liquid is retained with said micro-fiber mat;

(e) drying said micro-fiber mat composition at a temperature not exceeding the melt transition temperature of said polytetrafluoroethylene resin micro-fibers;

(f) compressing said micro-fiber mat; and (g) sintering said compressed dried micro-fiber mat at a temperature of between 327° C. to 400° C., whereby a multi-directional planar oriented isotropic PTFE resin structure is produced.

2. The process according to claim 1, wherein the polytetrafluoroethylene resin primary dispersion particles of step (a)(i) are produced from an aqueous dispersion of PTFE resin by:
   a) mixing said aqueous dispersion of PTFE with a water miscible PTFE resin wetting liquid;
   b) removing the water miscible wetting liquid containing the PTFE to yield a filter cake of PTFE resin dispersion particles;
   c) washing said filter cake of PTFE resin dispersion particles with additional alcohol to remove the remaining traces of water miscible wetting liquid; and
   d) drying said washed filter cake of PTFE resin dispersion particles at a temperature below the PTFE resin crystalline melting point to remove the water miscible wetting liquid.

3. The method according to claim 2, wherein the water miscible PTFE resin wetting liquid is an alcohol.

4. The method according to claim 3, wherein the alcohol is methyl or ethyl alcohol.

5. A process for making a multi-directional planar oriented isotropic polytetrafluoroethylene (PTFE) resin reinforced structure, said method comprising the steps of:
   (a) providing a slurry of 20 parts wetting liquid to 1 part polytetrafluoroethylene resin and reinforcement fibers at a temperature of about 125° C. comprising:
      (i) polytetrafluoroethylene resin primary dispersion particles ranging in size from 0.05 to 5.0 microns in diameter and contained within an aggregate particle of a coagulated dispersion resin having an average aggregate size of about 500 microns;
      (ii) reinforcement fibers of a diameter less than about 10 microns and a length between ½ to ¾ inch; and
      (iii) a wetting liquid having a surface tension of about 30 dynes/cm or less;
   (b) applying to said slurry a liquid shearing force provided by a high shear stirrer operating at a rotor tip speed of 2000 feet/minute or higher to produce a fiber slurry of polytetrafluoroethylene and reinforcement fibers;
   (c) after step (b) diluting said reinforcing fiber slurry with 35 parts wetting liquid at ambient temperature to terminate fiber formation and provide a free-flowing mix of diluted fiber slurry;
   (d) uniformly depositing said diluted fiber slurry onto a porous surface to form a homogeneous uniform thickness mat of combined fibers wherein said wetting liquid is removed;
   (e) drying said fiber mat composite at a temperature not to exceed the melt transition temperature of polytetrafluoroethylene micro-fibers;
   (f) compressing said fiber mat; and
   (g) sintering said compressed fiber mat at a temperature of between 327° C. to 400° C., whereby a multi-directional planar oriented isotropic PTFE resin structure is produced.

6. The process according to claim 5, wherein said slurry of step (a) further comprises:
   (iv) a fugitive pore former, wherein the size of said pore former is selected to replicate the pore size of said structure, and wherein said pore former comprises up to 90 percent of the total solids in the slurry by volume;
   wherein following step (g) said pore former is leached from said structure and said structure becomes porous.

7. The process according to claim 6, wherein said pore former is sodium chloride.

8. The process according to claim 5, wherein said step (d) comprises depositing said diluted micro-fiber slurry onto a porous filtering surface wherein 16 to 20 percent of said wetting liquid is retained with said micro-fiber mat.

9. The process according to claim 8, wherein a portion of said dried fiber mat is removed, then molded or embossed or molded and embossed before sintering.

10. The method according to claim 9, wherein said molding and embossing are performed at pressures up to 5000 psi and at temperatures less than 300° C.

11. The process according to claim 8, wherein heat up to 327° C. is applied and pressure up to 2000 psi is applied to laminate two or more sheets of said compressed fiber mat.

12. The process according to claim 5, wherein said reinforcement fiber is:
   (a) glass fibers for use in chemical systems encountering strong acids;
   (b) fibered carbon or graphite for use in chemical systems encountering strong bases;
   (c) fibered silicon carbide (SiC) for chemical systems encountering both acids and bases; or
   (d) fibered ceramics and ceramic oxides useful in mechanical and environmental applications.

13. The process according to claim 5, wherein the reinforcement fibers are a compatible polymeric fiber or particulate micron size resin for use in the enhancement of PTFE resin properties selected from the group consisting of abrasion prevention, adhesion promotion, improved strength, and reduced permeability.

14. The process according to claim 5, wherein said drying is performed at a temperature below PTFE resin's crystalline melting point but not to exceed 300° C.

15. The process according to claim 5, wherein said compressing step comprises compressing the mat of fibers for consolidation without increasing sheet area.

16. The process according to claim 5, wherein before step (g) a portion of said dried fiber mat is removed, then molded or embossed or molded and embossed.

17. The process according to claim 5, wherein heat up to 300° C. is applied and pressure up to 2000 psi is applied to laminate two or more sheets of said compressed fiber mat.

18. The process according to claim 5, wherein one or more compatible primary unmelted particulate polymeric resins of micron size are added to the slurry of step (a).

* * * * *

UNITED STATES PATENT AND TRADEMARK OFFICE
CERTIFICATE OF CORRECTION

| | | |
|---|---|---|
| PATENT NO. | : 7,744,792 B2 | Page 1 of 1 |
| APPLICATION NO. | : 11/701901 | |
| DATED | : June 29, 2010 | |
| INVENTOR(S) | : Robert Roberts | |

It is certified that error appears in the above-identified patent and that said Letters Patent is hereby corrected as shown below:

Column 8,
Line 63, "0.2 µ free" should read --0.2µ free--.

Signed and Sealed this

Sixteenth Day of November, 2010

David J. Kappos
*Director of the United States Patent and Trademark Office*